US009608747B2

(12) United States Patent
Okabayashi

(10) Patent No.: US 9,608,747 B2
(45) Date of Patent: Mar. 28, 2017

(54) DIGITAL MIXER AND PATCH SETTING METHOD OF DIGITAL MIXER

(71) Applicant: Yamaha Corporation, Hamamatsu-Shi, Shizuoka-Ken (JP)

(72) Inventor: Masaaki Okabayashi, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 14/502,763

(22) Filed: Sep. 30, 2014

(65) Prior Publication Data

US 2015/0092961 A1 Apr. 2, 2015

(30) Foreign Application Priority Data

Sep. 30, 2013 (JP) ................................ 2013-205198

(51) Int. Cl.
*H04B 1/00* (2006.01)
*H04H 60/04* (2008.01)

(52) U.S. Cl.
CPC .................................. *H04H 60/04* (2013.01)

(58) Field of Classification Search
CPC ...................................................... H04H 60/04
See application file for complete search history.

(56) References Cited

U.S. PATENT DOCUMENTS

| | | | | |
|---|---|---|---|---|
| 8,265,305 | B2 | 9/2012 | Aoki | |
| 2006/0282562 | A1* | 12/2006 | Aiso | H04H 60/04 710/33 |
| 2007/0025568 | A1* | 2/2007 | Aiso | H04H 60/04 381/119 |
| 2008/0215791 | A1 | 9/2008 | Aoki et al. | |
| 2011/0009989 | A1* | 1/2011 | Terada | H04H 60/04 700/94 |
| 2011/0058691 | A1 | 3/2011 | Okabayashi | |
| 2011/0228955 | A1* | 9/2011 | Fujita | H04H 60/04 381/119 |
| 2011/0235825 | A1* | 9/2011 | Okabayashi | H04H 60/04 381/107 |

FOREIGN PATENT DOCUMENTS

| | | | |
|---|---|---|---|
| EP | 2 367 307 | A2 | 9/2011 |
| EP | 2 367 307 | A3 | 9/2011 |
| JP | 2007-043249 | A | 2/2007 |
| JP | 2008-219231 | A | 9/2008 |
| JP | 2011-029899 | A | 2/2011 |
| JP | 4645347 | B2 | 3/2011 |
| JP | 2012-204864 | A | 10/2012 |

OTHER PUBLICATIONS

Extended European Search Report dated Feb. 20, 2015, for EP Application No. 14186762.2, six pages.

Notification of Reasons(s) for Refusal issued on Dec. 18, 2015, for JP Patent Application No. 2013-205198, with English translation, six pages.

* cited by examiner

*Primary Examiner* — Simon Sing
(74) *Attorney, Agent, or Firm* — Morrison & Foerster LLP

(57) ABSTRACT

In a digital mixer, when a patch of a certain channel is changed, values of parameters of one port which has been connected to the certain channel is applied as parameters of a newly connected port, thereby enabling to hand over parameters of the one port which have been set for the certain channel. Further, when a newly connected port is already connected to another channel, the digital mixer asks the user whether or not to apply the parameters of the one port.

5 Claims, 4 Drawing Sheets

INPUT PORT DATA IN CURRENT MEMORY

| |
|---|
| PORT DATA (1) |
| PORT DATA (2) |
| PORT DATA (3) |
| ⋮ |
| PORT DATA (Np) |

INPUT CHANNEL DATA IN CURRENT MEMORY

| |
|---|
| CHANNEL DATA (1) |
| CHANNEL DATA (2) |
| CHANNEL DATA (3) |
| ⋮ |
| CHANNEL DATA (Nc) |

INPUT PATCH DATA IN CURRENT MEMORY

| |
|---|
| PS(1) |
| PS(2) |
| PS(3) |
| ⋮ |
| PS(Nc) |

DIGITAL MIXER AND PATCH SETTING METHOD OF DIGITAL MIXER

TECHNICAL FIELD

The invention relates to a digital mixer to which audio signals are inputted through input ports and which performs processing such as mixing on the inputted signals and outputs the processed signals, and a patch setting method of the digital mixer.

BACKGROUND ART

It has been conventionally known digital mixers performing processing such as adding an effect or mixing by digital signal processing with respect to audio signals of plural series inputted through plural input ports and outputting the processed signals (for example, see PTL1, PTL2, and the like). These digital mixers have plural input ports performing processing such as inputting an analog audio signal and converting it into a digital audio signal, and plural input channels performing processing such as adding an effect or level control on the digital audio signal, and also have an input patch connecting a desired input port to each of the input channels. The user plugs, for example, a vocal microphone into an input terminal corresponding to a first input port, and performs setting so that the first input port and the first channel are connected by the input patch. Thus, the following processing can be carried out, that is, performing various types of signal processing on a vocal audio signal inputted by the microphone in the first channel, appropriately mixing the processed signal, and outputting the mixed signal.

To each input port described above, parameters for controlling operation of this input port are set by the user. The parameters set to the input port are retained corresponding to this input port, and thereafter, this input port operates according to these parameters. These parameters can be rewritten according to an instruction from a central processing unit (CPU) of the digital mixer.

CITATION LIST

Patent Literature

{PTL1} JP 4645347 B2
{PTL2} JP 2011-29899 A

SUMMARY OF INVENTION

Technical Problem

As described above, each input port operates according to the parameters which is set at a time of operation irrespective of what channel is connected to this input port. Therefore, when the input patch regarding a certain input channel is changed and a connection destination is changed from the first input port to a second input port, the newly connected second input port operates by using the parameters which is set at this time without change.

Incidentally, the input port as a destination of connecting an audio signal supply source such as a microphone is often changed. For example, there is a case where a microphone is plugged into the first input port and the setting is confirmed at a time of rehearsal, but there is a failure in the first input port at a time of actual performance, or there is a case where the first input port is used at a time of rehearsal for use in a festival where plural bands perform, and a microphone of a previous band is left plugged in the first input port at a time of actual performance, or the like. In such a case, a vacant input port is newly used, but the parameters set to this new input port are ones originally set regarding this port. Thus, there have been cases where an operation to redo setting of the same parameters as those set to the first input port which is used previously in the rehearsal to a new input port should be performed.

It is an object of the invention, in a digital mixer, to enable even when there is a change in a patch (for example, a connection state of a microphone and an input port) from the status at a time of previous setting, to apply setting of an input port which is connected at the time of previous setting to a newly connected port without performing an operation to redo setting of the newly connected port.

Solution to Problem

In order to achieve the above-described object, in the invention, when patch of a certain channel is changed, values of parameters of a port which has been connected to this channel can be overwritten to parameters of a newly connected port, thereby handing over the parameters of the port which have been set for the certain channel.

More Specifically, a digital mixer of the invention includes: plural ports each receiving an audio signal from an outside and processing and outputting the audio signal according to set parameters; plural channels each performing characteristic adjustment processing on a supplied audio signal and outputs the processed audio signal; a patch connecting one of the plural ports to each of the plural channels according to a patch operation by a user, and supplying the audio signal of the each one port to the channel connected to the one port; and a parameter applier applying, when a port connected to one channel is changed from a first port to a second port among the plural ports by the patch operation by the user, parameters set to the first port to the second port.

In the above described digital mixer, it is conceivable that when the port connected to the one channel is changed from the first port to the second port, if the second port is connected to no other channel than the one channel, the parameter applier unconditionally executes application of the parameters set to the first port to the second port, or if the second port is already connected to any other channel than the one channel, the parameter applier first asks the user for permission to apply parameters, and executes application of the parameters set to the first port to the second port on condition that a response of permitting application is received from the user.

It is also conceivable that the digital mixer further includes an activator activating the parameter applier in response to an activation operation by the user, wherein the parameter applier performing application of the parameters set to the first port to the second port when the parameter applier is activated by the activator or does not perform the application of the parameters when the parameter applier is not activated.

Further, a patch setting method of the invention is a method of setting a connection of one of plural ports each processing and outputting an audio signal received from an outside and a channel performing characteristic adjustment processing on a supplied audio signal, the method including: changing a port connected to the channel from a first port to a second port according to a patch operation of a user; and applying a setting of the first port before the change to the second port according to the change.

Advantageous Effects of Invention

According to the invention, when patch of a certain channel is changed, values of parameters of a port which has been connected to the certain channel can be applied (copied or overwritten for example) to parameters of a newly connected port, thereby handing over the parameters of the port which have been set for the certain channel. Thus, it is unnecessary to redo setting with respect to the newly connected port. Further, in a state that one certain port is connected to a first channel, when a connection of a second channel and the one port is further added by a patch change operation regarding the second channel, the user can choose whether to utilize an existing setting of the one port or to apply setting of a port connected to the second channel before the patch change operation to the one port. Thus, in the case where signals are outputted in parallel to plural channels from one port, setting of this port becomes easy. Moreover, whether or not to activate the application of parameters of a port can be set by an activator, and thus if processing in which setting of a port is related to a channel is unnecessary, this function can be inactivated.

DESCRIPTION OF EMBODIMENTS

Hereinafter, an embodiment of the invention will be described by using drawings.

Figure 1:
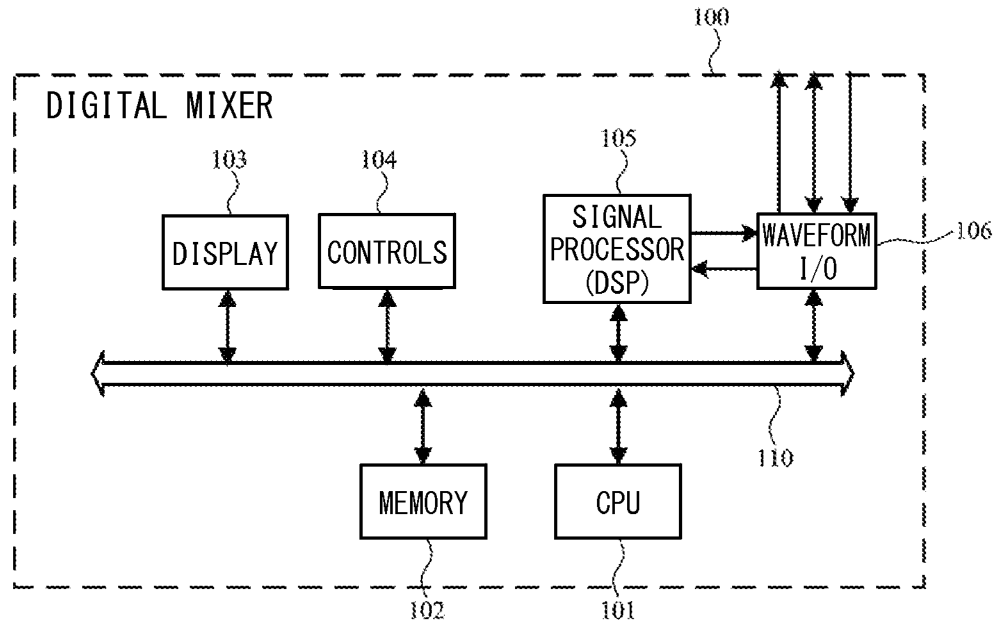
FIG. 1 is a diagram of a hardware structure of a digital mixer which is one embodiment to which this invention is applied.

FIG. 1 is a block diagram illustrating a hardware structure of a digital mixer 100 which is an embodiment of this invention. A CPU 101 is a processing device controlling operation of the entire mixer. A memory 102 is a storage device storing various programs executed by the CPU 101 and various data and the like, and can be structured by appropriately combining a RAM, a ROM, a flash memory, a hard disk, and/or the like. In the RAM or the flash memory of the memory 102, an area named a current memory is provided, and the CPU 101 controls various operations of this mixer based on various data stored in this area. A display 103 is a display for displaying various types of information and provided on a control panel of this mixer. Controls 104 are various types of controls (a moving fader, a rotary encoder, a switch, a button, and so on) for accepting operation by a user, which are provided on the control panel of this mixer. A signal processor 105 is, for example, a DSP and executes various signal processing programs based on instructions by the CPU 101 so as to perform mixing processing, effect adding processing, and volume level control processing, and the like on audio signals inputted via a waveform I/O 106, and outputs audio signals after the processing via the waveform I/O 106. A bus 110 is a bus line connecting these units, and is a general name referring to a control bus, a data bus, and an address bus. Note that a "signal" described in this specification represents an audio signal unless otherwise described particularly (unless it is described as a control signal).

Figure 2:
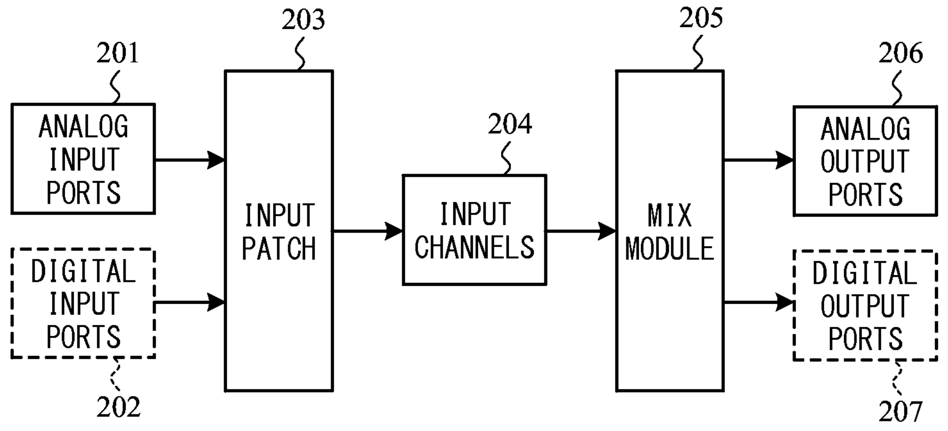
FIG. 2 is a block diagram illustrating a functional structure of mixing processing in the mixer of the embodiment.

FIG. 2 is a block diagram illustrating a functional structure of mixing processing realized by the mixer of FIG. 1. 201 denotes plural analog input ports converting an analog audio signal inputted from a signal supply source such as a microphone into a digital audio signal and outputting the digital audio signal. Each input port receives an analog audio signal inputted from the outside, converts it into a digital audio signal and supplies it to an input patch 203 based on port data set in the current memory by the CPU 101. The input patch 203 supplies a signal from any one of the input ports to each of plural input channels 204 according to patch data set in the current memory by the CPU 101. The plural input channels 204 each perform characteristic adjustment processing of amplitude characteristic, frequency characteristic, and the like on a supplied signal based on input channel data set to the current memory by the CPU 101. Signals outputted from the plural input channels 204 are mixed in a MIX module 205, and a mixed signal thereof is converted into an analog audio signal and is outputted to the outside by an analog output port 206.

Note that the input ports 201 and the output port 206 are realized by the waveform I/O 106 and the CPU 101 controlling the waveform I/O 106 of FIG. 1. The other parts denoted by 203 to 205 are realized by the signal processor 105 executing a predetermined signal processing program and the CPU 101 controlling this signal processor 105. This signal processing program is also one which is set by the CPU 101 to the signal processor 105.

Figures 3, 4A, 4B, 4C:
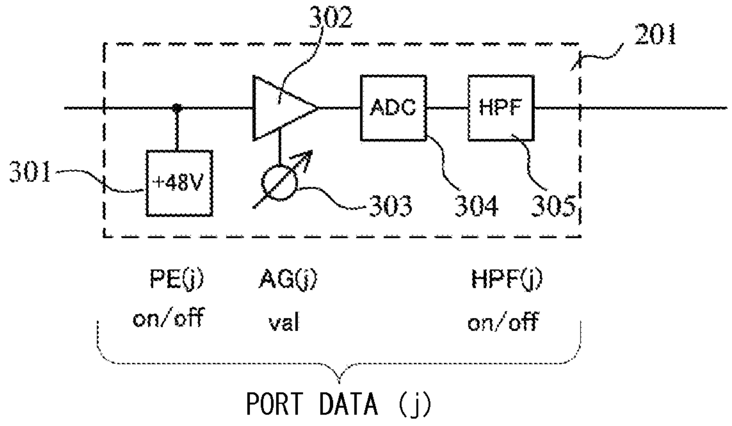
FIG. 3 is a detailed structural diagram of an analog input port in the mixer of the embodiment.
FIG. 4A is a diagram illustrating a memory map of data on a current memory.
FIG. 4B is another diagram illustrating a memory map of data on a current memory.
FIG. 4C is still another diagram illustrating a memory map of data on a current memory.

FIG. 3 illustrates a detailed structure of one port among the plural analog input ports 201. FIG. 3 illustrates a j-th port among the plural ports, and the j-th port will be hereinafter called an input port j. The above-described port data are parameters prepared for each of the ports, and the input port j operates based on j-th port data (called port data (j)) among them. Under each component of FIG. 3, a symbol of a parameter for controlling the component is described. Since each of them is a parameter in the port data (j), (j) is added to the symbol of each parameter.

301 denotes a phantom power supply for supplying power to the signal supply source such as a microphone connected to this input port, and PE(j) is a parameter specifying on/off of this phantom power supply. 302 denotes a head amplifier adjusting gain so that the analog audio signal is at an appropriate level for analog-digital conversion (AD conversion), 303 denotes a gain adjuster of the head amplifier 302, and AG(j) is a parameter indicating this gain value. 304 denotes an AD converter. 305 denotes a high-pass filter (HPF) for removing direct current components of an inputted signal, and HPF(j) is a parameter specifying on/off of this HPF 305.

Although not illustrated, each of the plural input channels 204 of FIG. 2 has, for example, components such as an equalizer controlling frequency characteristics of a signal, a compressor dynamically changing gain of a signal to compress a dynamic range, and a level controller regulating a signal level by constant gain. An i-th channel among the plural input channels 204 is called an input channel_i. The above-described input channel data are prepared for each input channel, and the input channel_i operates based on i-th input channel data (called channel data (i)) among them. Respective components of the above-described input channel_i operate according to parameters included in the channel data (i).

The analog input ports and the input channels have been described above, but each of the other blocks of FIG. 2 similarly operates according to various data stored in the current memory. In other words, the CPU 101 constantly executes processing to reflect various data of the current memory on operation of the display 103, the signal processor 105, the waveform I/O 106, and so on. Therefore, the digital mixer 100 is structured such that operation of the respective modules of the mixer 100 can be controlled by setting or changing values of various data in the current memory according to an operation of the user.

FIG. 4A to FIG. 4C illustrate memory maps of port data in the current memory. As described in FIG. 4A, the current memory stores Np sets of port data (1) to port data (Np) corresponding to Np analog input ports. FIG. 4B illustrates a memory map of channel data in the current memory. As described in FIG. 4B, the current memory stores Nc sets of channel data (1) to channel data (Nc) corresponding to Nc input channels. FIG. 4C illustrates input patch data in the current memory. As described in FIG. 4C, the current memory stores Nc sets of data PS(1) to (Nc) corresponding to Nc input channels. Input patch data PS(i) corresponding to each input channel_i store the numbers of input ports connected (patched) to this input channel_i.

Figure 5:
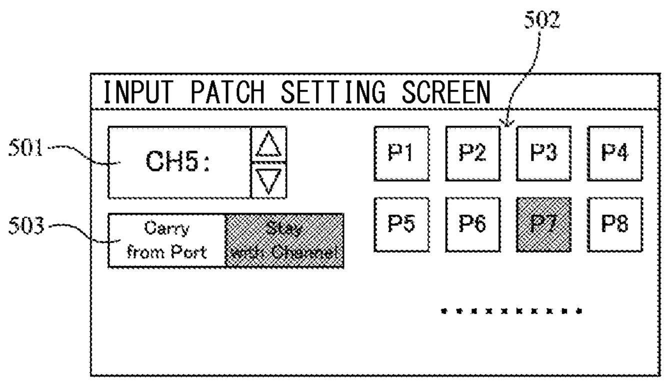
FIG. 5 is a diagram illustrating an input patch setting screen.

FIG. 5 illustrates an example of an input patch setting screen for setting input patch data of FIG. 4C. When the user performs a predetermined operation on the control panel, the CPU 101 displays the screen of FIG. 5 on the display 103, making a state that setting of input patch can be performed. A channel specifying area 501 is an area accepting a specification of a setting target channel, and when the user clicks an upward or downward triangle sign on a right side with a pointing device, the CPU 101 changes the input channel for performing setting of input patch and updates the display thereof. The channel ch5 is specified in the diagram.

Select buttons 502 are a group of buttons for selecting one of ports as a connection destination (patch destination) of the channel specified in the area 501. Each button displays letters "Pj" indicating that the port of a port number j (=1 to Np) is selected by turning on this button. In the diagram, a "P7" button is turned on, and it can be seen that an input port 7 is patched to the input channel 5. Seen from the input channel side, only one input port is patched to one input channel, and thus the input port to be selected by the button group 502 is always one. Seen from the input port side, it is possible to output a signal to plural input channels from one input port. Note that although an example of displaying eight buttons corresponding to the port is presented here, the number of buttons of ports is arbitrary. The port displayed on the screen may be switched according to an operation of another button or the like. Further, it is not limited to the style of displaying each port by a button, and a port may be displayed or selected in another style such as a pull-down list.

The operation of turning on a "Pj" button by the user corresponds to a "patch operation by a user", and the CPU 101 executes processing of FIG. 6 which will be described later according to this operation.

A mode selecting area 503 has buttons to select "Carry from Port" or "Stay with Channel" which are modes for specifying operation when there is a patch change. These two modes are such that one of them is alternatively selected, and the CPU 101 sets a flag SWC indicating the current mode according to on operation of one button, and displays the operated button as on and displays the other button as off. The flag SWC is set to "0" indicating that the current mode is the Carry from Port when the "Carry from Port" is operated to on, or set to "1" indicating that the current mode is the Stay with Channel when the "Stay with Channel" is operated to on. In the diagram, the "Stay with Channel" button is turned on. In a state that the "Carry from Port" button is on (SWC=0), when there is a patch change of a certain channel, port data of an input port newly chosen as a patch destination are not changed. In a state that the "Stay with Channel" button is on (SWC=1), when there is a patch change of a certain channel, values of port data of the port patched to the certain channel before the patch change are overwritten (copied) on port data of a port chosen as the patch destination after the patch change. In this embodiment, selection of mode by the mode selecting area 503 is applied to all the channels. Note that although performing this mode setting in common to the channels is preferred, the mode setting may also be performed on each channel.

Processing of the CPU 101 to set the SWC flag according to the user's operation to the mode selecting area 503 corresponds to an "activator", the state of SWC=1 corresponds to "when it is activated", and the state of SWC=0 corresponds to "when it is not activated".

Figure 6:
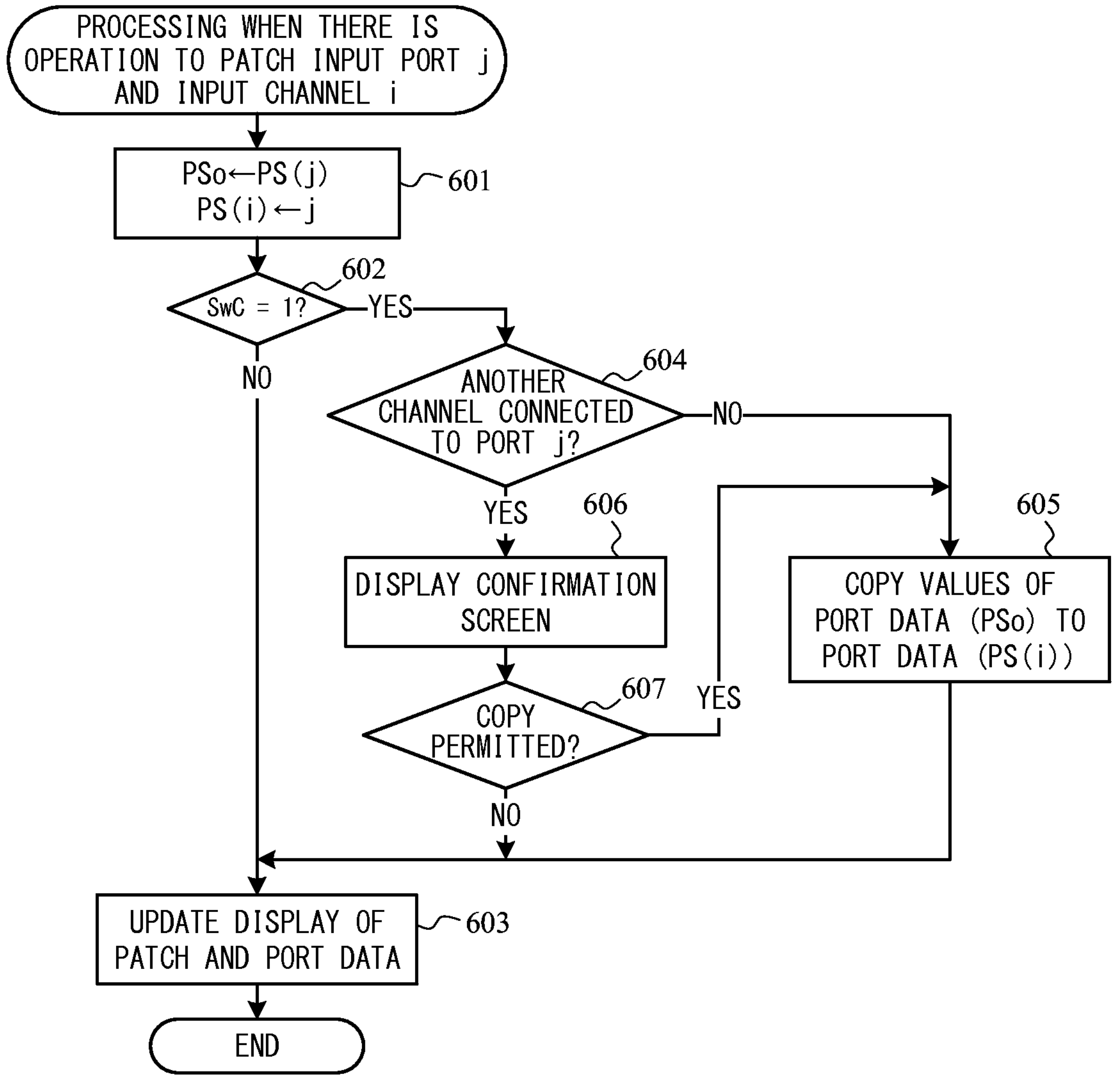
FIG. 6 is a flowchart illustrating processing executed when there is a patch change operation.

FIG. 6 illustrates processing of the CPU 101 when there is a patch change operation of an input channel_i in the input patch setting screen of FIG. 5. Here, it is assumed that the input port j (j-th analog input port) is selected as an input port to be a new patch destination for the input channel_i.

In step 601, the CPU 101 saves value of current patch destination PS(i) of the input channel_i to a work register PSo, and sets PS(i) at the port number j of the new patch destination. Thus, in background processing of the CPU 101 which is not illustrated, control of the input patch 203 (actually the signal processor 105 and the waveform I/O 106) is performed based on the value of PS(i) after the change in the current memory, and thereby a signal of the analog input port j as the new patch destination is supplied to the input channel_i. Next, in step 602 the CPU 101 judges whether value of the flag SWC is 1 or not. When SWC=0 in step 602, the current mode is the Carry from Port. Thus, the CPU 101 does note perform rewriting of port data of the analog input port j, and in subsequent step 603, the CPU 101 updates the screen display so that only the "Pj" button is on among the select buttons 502.

When SWC=1 in step 602, the current mode is the Stay with Channel. Thus, in step 604, the CPU 101 checks whether another input channel is connected to the analog input port j specified as a new patch destination or not. Specifically, in a range of PS(1) to PS(Nc) of FIG. 4C, a search for presence of input patch data with a value of port number j other than the previously set PS(i) is performed. When no other input channels are connected (relevant data is not present), in step 605 the CPU 101 copies values of port data (PSo) of the analog input port related to the input channel_i before the patch change are copied to port data (j) of the analog input port j as a new connection destination after the patch change. Thereafter, the process proceeds to step 603. When another input channel is connected to the analog input port j specified as a new patch destination (when relevant data are present), the process proceeds from step 604 to step 606, and the CPU 101 displays a confirmation screen (omitted in illustration) for asking the user for permission to change values of port data (j) of the analog input port j of the new patch destination is displayed. When the user responds by permitting the change (step 607: YES), the process proceeds from step 607 to 605, and the CPU 101 copies the values of port data (PSo) to the port data (j), updates a screen display so that only the "Pj" button is on in subsequent step 603. Further, if values of port data (j) are displayed in the display 103 and/or the controls 104, the CPU 101 updates this display to the values after the copy. When the user responds by not permitting the change (step 607: NO), the process proceeds from step 607 to step 603 without rewriting the port data (j), and the CPU 101 updates the screen display so that only the "Pj" button is on.

By executing the processing of step 601, the CPU 101 functions as a patch to connect one of the ports to each channel. By executing the processing of step 604 to step 607, the CPU 101 functions as a parameter applier which applies parameters of port data set to the first port as parameters of the second port.

Figure 7:
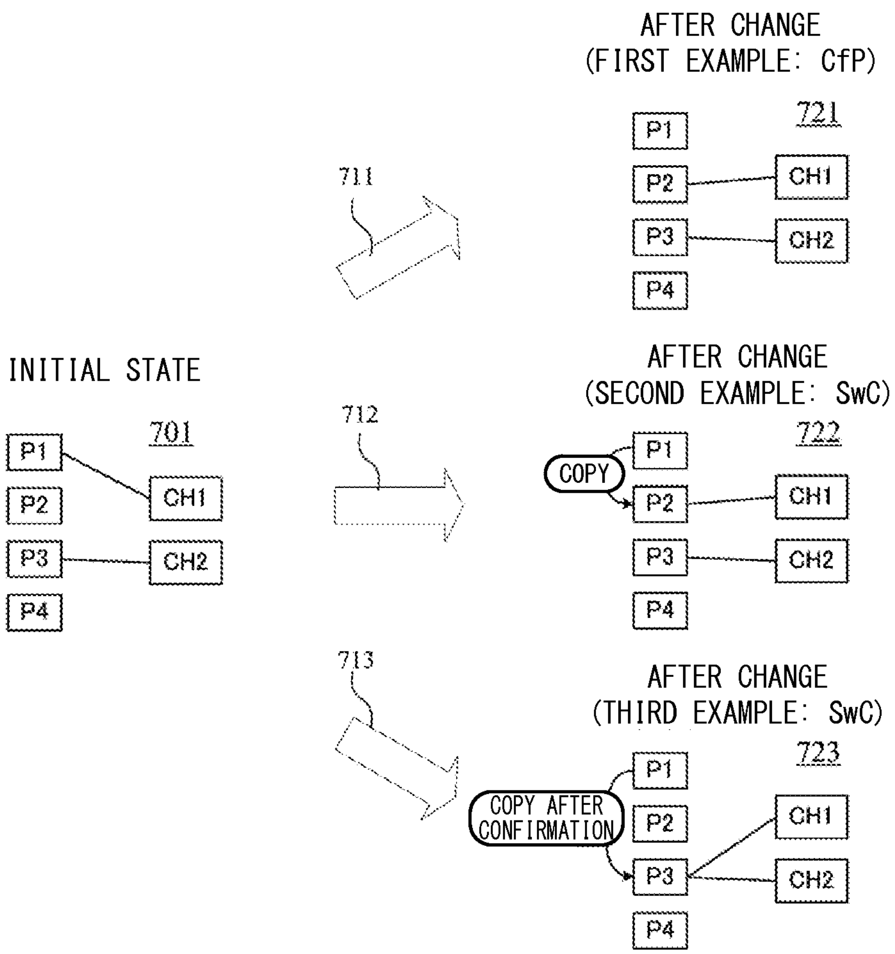
FIG. 7 is a diagram illustrating examples of changes of patch.

FIG. 7 illustrates three examples of changes of the patch in the mixer of this embodiment. In the first example (arrow 711), in the Carry from Port mode, the user performs an operation to change the patch destination of the input channel_1 (CH1 in the diagram) from an input port 1 (P1 in the diagram) to an input port 2 (P2 in the diagram), and accordingly status of the patch is changed from a state 701 in which the input channel_1 is connected to the input port 1 to a state 721 in which the input channel_1 is connected to the input port P2. In this case, port data (2) of the input port 2 are not changed, and in the state 721 after the change, the input port 2 performs gain regulation or the like of an audio signal received from the outside based on the port data (2) with values not changed from those before the patch change, and the input patch 203 supplies the processed signal to the input channel_ 1.

In the second example (arrow 712), in the Stay with Channel mode, the user performs an operation to change the patch destination of the input channel_1 from the input port 1 to the input port 2, and accordingly status of the patch is changed from a state 701 in which the input channel_1 is connected to the input port 1 to a state 722 in which the input channel_1 is connected to the input port 2. In this case, no other input channel is connected to the input port 2 as a new patch destination, and thus in the state 722 after the change, the values of port data (1) of the input port 1 as the patch destination before the patch change are copied to port data (2) of the input port 2 as the new patch destination after the patch change. Specifically, the input port 2 performs gain regulation and/or the like of an audio signal received from the outside based on the port data (2) having the same values as the port data (1), and the input patch 203 supplies the processed signal to the input channel_1.

In the third example (arrow 713), in the Stay with Channel mode, the user performs an operation to change the patch destination of the input channel_1 from the input port 1 to an input port 3, and accordingly, status of the patch is changed from the state 701 in which the input channel . . . is connected to the input port 1 to a state 723 in which the input channel_1 is connected to the input port 3. In this case, the port P3 as a new patch destination is already patched to another input channel_2, and thus step 606 of FIG. 6 is executed in the process of change of arrow 713 and the above-described confirmation screen is displayed. Here, when the user permits to change values of port data (3), in the state 723, the values of port data (1) of the input port 1 are copied to port data (3) of the input port 3 as the new patch destination. Thus, the input port 3 performs gain regulation or the like of an audio signal received from the outside based on the port data (3) having the same values as the port data (1), and the input patch 203 supplies the processed signal to the input channel_1 and the input channel_2. On the other hand, when the user does not permit to change the values of port data (3), the port data (3) are not overwritten, and the input port 3 performs gain regulation and/or the like of an audio signal received from the outside based on the port data (3) having the same values as those before the patch change, and the input patch 203 supplies the processed signal to the input channel_1 and the input channel_2.

In the mixer of the embodiment, for example, when an input port different from that at the time of rehearsal is connected to a certain input channel in actual performance, by selecting the Stay with Channel and performing a change operation of the patch thereof, setting of the input port used at the time of rehearsal is copied to the newly patched input port. Thus, it becomes unnecessary to perform operations to redo setting of the input port, thereby improving convenience for the user.

Note that there is a kind of the digital mixer which has a preset function such that plural sets of various settings of the current memory are stored as presets (may also be referred to as scenes) in advance, and the user can select one of the presets and recall the preset to the current memory, thereby reproducing various settings in the apparatus at once. The preset can include patch data of FIG. 4C. When a preset including the patch data is recalled, setting of the input patch is changed. Regarding this case, irrespective of whether the current mode is the Stay with Channel or the Carry from Port, the digital mixer may be structured not to perform copy of patch data among the input ports as described above. This is because the copy function of port data of the invention is aimed at corresponding to a contingent change of the input port to be used, and this change cannot be preset in advance. Note that although the preset can include the port data of FIG. 4A, in recall of a preset including values of the port data, the values of the port data included in this preset are overwritten on port data of respective ports.

In the above-described embodiment, an area to store the port data of respective input ports as illustrated in FIG. 4A is secured in the current memory, and when there is a patch change while the Stay with Channel is on, values of the port data are copied in the current memory. However, it may also be structured to have actual bodies of the port data in another area, and store only link information referring to the port data in the current memory. In this case, to copy the port data, it is just necessary to rewrite the link information. However, when values of port data of either the copy source or the copy destination are changed, it is necessary to copy the values of the port data to another area to return them to be two independent sets of port data.

Although the above-described embodiment is structured to have only the analog input ports 201 having a common data structure of port data as the input ports, it may be structured to further have analog input ports 201' of different type having a different data structure of port data and/or digital input ports 202. In the copy processing of step 605, when data structures are different between the copy source and the copy destination, it may be structured not to perform the copy processing, or structured to perform copy of only a matching part. The copy function of port data of the invention is applied to the input patch 203, but it can also be applied to an output patch connecting the output channel and the output port. The embodiment is structured to have only the analog output port 206 as the output port, but may be structured to further have a digital output port 207.

The above-described embodiment is a digital mixer of integrated type, but the present invention may also be applied to a mixer system structured by connecting a console having a control panel, an engine having a signal processing unit, and an I/O unit having a waveform I/O.

The above-described embodiment is a digital mixer having a dedicated hardware structure, but a part or all of its functions can be replaced with a personal computer (PC) executing appropriate software. For example, an engine having a signal processor and a waveform I/O may be connected to a PC, and this PC may be made operate as a console to control the engine. Alternatively, an I/O unit having a waveform I/O may be connected to a PC, and this PC may be made operate as a console and a signal processing engine. Further, the console and the engine may also be realized on a virtual machine. The patch setting screen is not limited to the type illustrated in FIG. 5, and may be any type of patch setting screen realized in publicly known digital mixers. As a representative example, there is one displaying a matrix of plural supply sources and plural supply destinations. In this matrix, the user performs an operation to turn on the intersection of a desired supply source and a desired supply destination to thereby set the connection between the supply source and the supply destination, and then a signal from the supply source is supplied to the supply destination.

REFERENCE SIGNS LIST

100 . . . digital mixer, 101 . . . central processing unit (CPU), 102 . . . memory, 103 . . . display unit, 104 . . . controls, 105 . . . signal processor (DSP), 106 . . . waveform I/O.

The invention claimed is:

1. A digital mixer, comprising:

plural ports each receiving a respective audio signal from an outside and processing and outputting the respective audio signal according to set parameters;

plural channels each performing characteristic adjustment processing on a respective supplied audio signal and outputting the respective processed audio signal;

a patch connecting one port of the plural ports to one channel of the plural channels as a connecting port, and supplying the audio signal of the connecting port to the one channel connected to the one port; and a parameter applier applying, in response to the connecting port being changed from a first port to a second port among the plural ports by a patch operation by the user, parameters set to the first port as parameters to the second port.

2. The digital mixer according to claim 1, wherein when the connecting port, connected to the one channel, is changed from the first port to the second port, if the second port is connected to no other channel than the one channel, the parameter applier unconditionally executes application of the parameters set to the first port as parameters to the second port, or if the second port is already connected to any other channel than the one channel, the parameter applier first asks the user for permission to apply parameters, and executes application of the parameters set to the first port as parameters to the second port on condition that a response of permitting application is received from the user.

3. The digital mixer according to claim 1, further comprising:

an activator activating the parameter applier in response to an activation operation by the user, wherein the parameter applier performs application of the parameters set to the first port as parameters to the second port when the parameter applier is activated by the activator or does not perform the application of the parameters when the parameter applier is not activated.

4. The digital mixer according to claim 2, further comprising:

an activator activating the parameter applier in response to an activation operation by the user, wherein the parameter applier performs application of the parameters set to the first port as parameters to the second port when the parameter applier is activated by the activator or does not perform the application of the parameters when the parameter applier is not activated.

5. A setting method for a digital mixer, the digital mixer comprising plural ports each for processing and outputting a respective audio signal to be received from an outside in accordance with a setting thereof, a channel for performing characteristic adjustment processing on a supplied audio signal, a patch for connecting one of the plural ports to the channel as a connecting port, and a parameter applier for applying a parameter setting, wherein the plural ports of the digital mixer include a first port and a second port, the method comprising:

changing, via the patch, the connecting port connected to the channel of the digital mixer, from the first port of the digital mixer to the second port of the digital mixer according to a patch operation of a user, wherein after the change the audio signal to be outputted from the second port of the digital mixer is the supplied audio signal for the channel of the digital mixer; and applying, via the parameter applier, in response to the connecting port being changed from the first port to the second port, a parameter setting of the first port of the digital mixer before the change as a parameter setting of the second port of the digital mixer according to the change.

* * * * *